United States Patent Office 3,181,234
Patented May 4, 1965

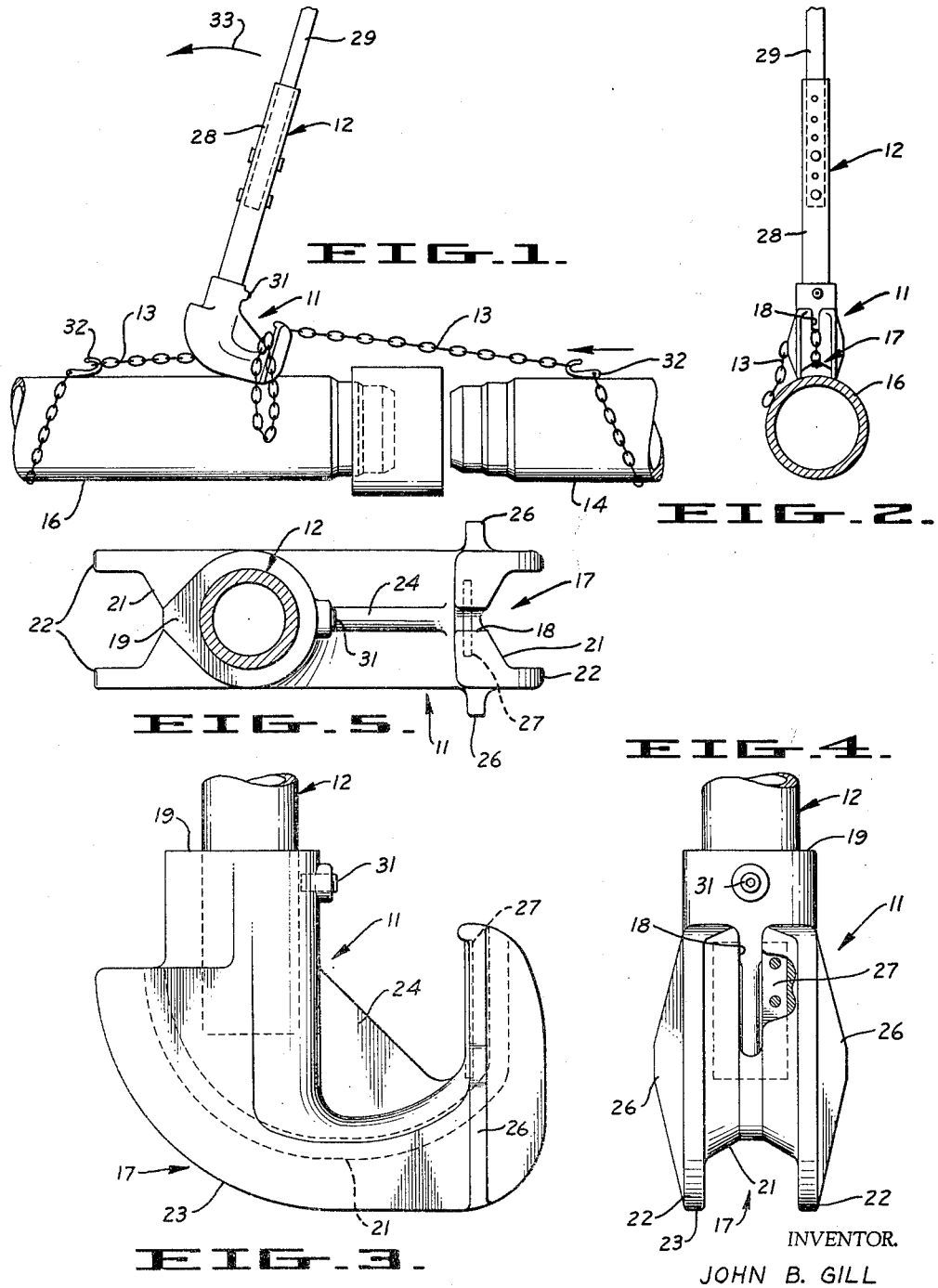

3,181,234
PIPE PULLING TOOL
John B. Gill, 20433 Earl St., Torrance, Calif.
Filed Oct. 16, 1961, Ser. No. 145,044
7 Claims. (Cl. 29—237)

The present invention relates to improvements in a pipe pulling tool, and more particularly to a pipe pulling tool suitable for bringing two sections of pipe or the like axially closer together.

It is well known that when assembling sections of heavy pipe, it is sometimes difficult to bring the pipe sections together in proper alignment for coupling. This problem is particularly acute when pipes are to be coupled on, say, difficultly accessible lines or when the pipe is made of asbestos-cement or like materials. In other words, a new tool is needed when methods, such as stabbing, are impossible or are impractical to use.

There is now a tool available for accomplishing these jobs designed by S. W. Norman. This tool comprises a body member having a socket for receiving a peavey handle or the like and a slot for gripping a chain. The tool operates in combination with the chain which is attached to each of two pipes. As the tool is rotated, the pipes are brought together by gathering a section of the chain in the body member.

Prior to this invention, the tool was made by welding appropriate pieces of steel together. Thus the tool was adapted to be made by bench scale methods. In addition, tools suitable to move large pipes were necessarily somewhat heavy.

The present invention relates to an improved form of a Norman type tool which may be fabricated by production methods and which has improved strength based on a given weight of material. Briefly speaking, this is accomplished by including certain additional structural components and redesigning the shape of certain others to provide additional strength over that heretofore available.

Accordingly it is a primary object of the present invention to provide a pipe pulling tool of the above character which has a sturdy design and rugged construction suitable for long periods of satisfactory service.

Another object of this invention is the provision of a pipe pulling tool that is light in weight, low in cost and which may be fabricated from aluminum or like metals.

A further object of the invention is to provide a pipe pulling tool which is easily handled and transported.

Still another object of this invention is to provide a pipe pulling tool of the character described that has excellent leverage, and is easily used for rotation or axial movement of pipes, pipe fittings or the like.

Further objects and advantages of my invention will be apparent as the specification progresses, and the new and useful features of my pipe pulling tool will be fully defined in the claims attached hereto.

The preferred forms of my invention are illustrated in the accompanying drawing, in which:

FIGURE 1 is a front elevational view of the pipe pulling tool of this invention shown in operative position on a pair of pipe sections;

FIGURE 2, an end elevation of the view shown in FIGURE 1, partly in section;

FIGURE 3, an enlarged front elevational view of the pipe pulling tool;

FIGURE 4, an enlarged end elevational view of the pipe pulling tool; and

FIGURE 5, an enlarged top view of the pipe pulling tool of this invention.

While I have shown only the preferred forms of my invention, it should be understood that various changes or modifications may be made within the scope of the claims attached hereto without departing from the spirit of the invention.

Referring to the drawing in detail, there is shown a pipe pulling tool comprising a body member 11 equipped with a handle 12 and a chain 13 for moving sections of pipes 14 and 16 relatively towards each other. As seen in FIGURE 1, the pulling force is obtained by using a lever action. Therefore, considerable strain is imposed upon the body member 11.

Body member 11 contains a curved channel section 17 having a slot 18 at one end thereof and a socket 19 at the other end. The curved channel section contains a substantially V-shaped floor 21 and a pair of side walls or flanges 22. As best seen in FIGURE 3, the floor 21 defines an arc having tangents going from a position substantially parallel to the handle 12 to a straight section at the slot 18, and again substantially parallel to the handle. Similarly, the flanges 22 have edges defining an arc somewhat concentrically away from the arc of the floor. However, the edges of the flanges do not have a constant curvature, and the variable curvature allows a variable leverage force as the tool is rotated on the edges 23 of the flanges against the pipe.

As indicated above, it is an important feature of the invention that reinforcing members are provided to give a light weight yet strong unit. Tensor member 24 is one such member and it serves to hold the pulling force between slot 18 and socket 19. It is also made integral with the inner wall of the channel section 17 so as to cooperate with flanges 22 in holding firm against bending moment stresses in the channel section as leverage force is applied.

It is also seen that the floor 21 of the channel section 17 is substantially V-shaped, and this configuration provides strength against the possibility of flanges 22 being spread apart as they are urged against the round pipe surface. As seen in FIGURE 1, the chain 13 fits into the slot 18 and is held by crossways position of a link as is a well known way of gripping a chain. However, the curved surface of the link tends to spread the channel section at the slot 18. In order to protect against this force, reinforcing ribs 26 are provided on the channel section at the area where the slot 18 is located.

In some cases, it has been found that where the metal is light weight, the metal at the slot 18 is soft enough that the chain tends to form dents therein. This can be corrected by providing a steel plate 27 which may be cast into the unit as shown in FIGURE 5, or fastened to the surface contacting the chain. In fact, it is believed that a hard alloy on the surface may give even better results.

Although various handles may be fit into socket 19 and used, I prefer to use a section of pipe 28 and another section of pipe 29 telescoped therein. Handle 12 may be removed for putting the equipment away, and it may be held in the socket when in use by means of set screw 31. The chain used is a standard type chain having hooks 32 at each end thereof.

In order to use the pipe pulling tool for coupling pipes, the set-up shown in FIGURE 1 is used. First the pipe ends are lubricated and started into the coupling. Then the chain 13 is hooked around each pipe as shown with hooks 32 in an upward position. One end of the chain is pulled tight within the channel section 17 and fit into slot 18. The other end of the chain is also pulled tight and fit into slot 18 with the position of the tool substantially as shown in FIGURE 1.

After the chain is in place, the handle 12 is pulled backward with a strong even stroke to pull the pipe into position. The pipe moves as the chain is held in the channel and shorted from a straight to a curved section. At the same time, tremendous leverage is provided. If necessary, a new bite may be obtained to increase the pulling distance.

Other moves may be made with the tool of this invention, for example fittings may be pulled axially into place in a manner similar to that given for coupling two pipes. The tool may also be used as tongs to rotate the pipe by turning the tool so as to rotate in a plane perpendicular to the axis of the pipe and grip a chain hooked around the pipe.

I claim:

1. A pipe pulling tool for bringing two sections of pipe and the like axially closer together through a chain gripping both sections of pipe and lever means acting to bring the end portions of the chain relatively closer together, comprising a curved body member having walls defining a curved channel section containing a floor and a pair of side walls adapted to ride against a pipe and hold a section of chain within the channel, said curved channel section having a nonuniform curvature, said floor having a pair of inclined surfaces which define a V-shape in cross-section, means at one end of the channel for holding fixed positions of the chain, and means adapted to hold a lever at the other end of the channel.

2. A pipe pulling tool for bringing two sections of pipe and the like axially closer together through a chain gripping both sections of pipe and lever means acting to bring the end portions of the chain relatively closer together, comprising a curved body member having walls defining a curved channel section adapted to ride against a pipe and hold a section of chain within the channel, said channel having a floor and pair of side walls, said floor having a pair of inclined surfaces which define a V-shape in cross-section, means at one end of the channel for holding fixed positions of the chain, means adapted to hold a lever at the other end of the channel for rocking the curved body member on the pipe and bringing the extreme ends of the chain closer together, and a tensor member between the first and second named means.

3. A pipe pulling tool for bringing two sections of pipe and the like axially closer together through a chain gripping both sections of pipe and lever means acting to bring the end portions of the chain relatively closer together, comprising a curved body member having walls defining a curved channel section adapted to ride against a pipe and hold a section of chain within the channel, said channel having a floor and pair of side walls, said floor having a pair of inclined surfaces which define a V-shape in cross-section, walls defining a slot through the channel at one end thereof for holding fixed positions of the chain, a socket adapted to hold a lever at the other end of the channel, and a reinforcing member disposed within a segment adjacent to the curved wall of the curved body member and serving as a tensor member between the slot and the socket.

4. A pipe pulling tool for bringing two sections of pipe and the like axially closer together through a chain gripping both sections of pipe and lever means acting to bring the end portions of the chain relatively closer together, comprising a curved body member having walls defining a curved channel section adapted to ride against a pipe and hold a section of chain within the channel, said channel having a floor and pair of side walls, said floor having a pair of inclined surfaces which define a V-shape in cross-section, walls defining a slot through the channel at one end thereof for holding fixed positions of the chain, reinforcing ribs on the side walls of the channel section at the end where the slot is located, a socket adapted to hold a lever at the other end of the channel, and a reinforcing member disposed within a segment adjacent to the curved wall of the curved body member and serving as a tensor member between the slot and the socket.

5. The pipe pulling tool defined in claim 4, in which the tool is made of aluminum.

6. The pipe pulling tool defined in claim 5, in which the channel section has a steel plate at the slot.

7. A cast aluminum pipe pulling tool for bringing two sections of pipe axially closer together through a chain gripping both sections of pipe and lever means acting to bring the end portions of the chain relatively closer together, comprising a curved body member having walls defining a curved channel section adapted to ride against a pipe and hold a section of chain within the channel, said channel having a floor and pair of side walls, said floor having a pair of inclined surfaces which define a V-shape in cross-section, walls defining a slot through the channel at one end thereof for holding fixed positions of the chain, a steel plate at the slot for providing a hard surface to grip the chain, reinforcing ribs on the side walls of the channel section at the end where the slot is located, a socket adapted to hold a lever at the other end of the channel, means for holding a handle in the socket, and a reinforcing member disposed within a segment adjacent to the curved wall of the curved body member and serving as a tensor member between the slot and the socket.

References Cited by the Examiner

UNITED STATES PATENTS

| | | | |
|---|---|---|---|
| 317,163 | 5/85 | McCaslin | 29—267 X |
| 1,350,084 | 8/20 | Schrub | 29—238 |
| 2,693,935 | 11/54 | Halbert | 254—131 |
| 2,698,161 | 12/54 | Kirby | 254—130 |
| 2,704,200 | 3/55 | Call | 254—131 |

WILLIAM FELDMAN, *Primary Examiner.*

WHITMORE A. WILTZ, *Examiner.*